United States Patent
Li et al.

(10) Patent No.: US 7,178,834 B2
(45) Date of Patent: Feb. 20, 2007

(54) ADAPTIVE RELEASE CAPSULE FOR STEERING COLUMN

(75) Inventors: Xiaoyu Li, Saginaw, MI (US); John F. Schulz, Hemlock, MI (US); Tracy L. Zehnder, Frankenmuth, MI (US); Richard K. Riefe, Saginaw, MI (US); David M. Byers, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 307 days.

(21) Appl. No.: 10/840,692

(22) Filed: May 6, 2004

(65) Prior Publication Data

US 2005/0248142 A1   Nov. 10, 2005

(51) Int. Cl.
*B62D 1/00*   (2006.01)
(52) U.S. Cl. ........................... 280/777; 74/492
(58) Field of Classification Search ............... 280/777, 280/779, 775; 74/492, 493
See application file for complete search history.

(56) References Cited

U.S. PATENT DOCUMENTS

| | | | | |
|---|---|---|---|---|
| 4,886,295 A * | 12/1989 | Browne | ...................... | 280/777 |
| 4,946,195 A * | 8/1990 | Ioka et al. | ................... | 280/777 |
| 5,390,955 A * | 2/1995 | Kaliszewski et al. | ....... | 280/777 |
| 5,482,320 A | 1/1996 | Passebecq | ................... | 280/777 |
| 5,899,116 A * | 5/1999 | Armstrong et al. | ........... | 74/492 |
| 6,234,528 B1 * | 5/2001 | Ben-Rhouma et al. | ...... | 280/777 |
| 6,290,258 B1 * | 9/2001 | Parkinson et al. | .......... | 280/775 |
| 6,296,280 B1 | 10/2001 | Struble et al. | | |
| 6,322,103 B1 * | 11/2001 | Li et al. | ...................... | 280/777 |
| 6,367,840 B1 * | 4/2002 | Duval et al. | ................. | 280/777 |
| 6,578,872 B2 * | 6/2003 | Duval et al. | ................. | 280/777 |
| 6,631,924 B2 * | 10/2003 | Nomura et al. | ............. | 280/777 |
| 6,641,167 B2 * | 11/2003 | Riefe et al. | .................. | 280/777 |
| 6,764,098 B2 * | 7/2004 | Matsumoto et al. | ........ | 280/777 |
| 6,799,486 B2 * | 10/2004 | Manwaring et al. | .......... | 74/493 |
| 2003/0226417 A1 * | 12/2003 | Manwaring et al. | .......... | 74/492 |
| 2004/0004348 A1 | 1/2004 | Manwaring et al. | | |
| 2004/0164538 A1 * | 8/2004 | Li et al. | ...................... | 280/777 |
| 2004/0232685 A1 * | 11/2004 | Gatti et al. | ................. | 280/777 |
| 2005/0082812 A1 * | 4/2005 | Duffy et al. | ................. | 280/777 |

FOREIGN PATENT DOCUMENTS

DE   10154608   5/2003

* cited by examiner

*Primary Examiner*—Paul N. Dickson
*Assistant Examiner*—Drew J. Brown
(74) *Attorney, Agent, or Firm*—Michael D. Smith

(57) ABSTRACT

The present invention provides an apparatus for supporting a steering wheel in a vehicle during normal vehicle handling and is breakable in response to an impact situation. The apparatus includes a member attachable to a vehicle and a steering column connected to the member for sliding movement. The apparatus also includes a capsule for connecting the member and the steering column to one another to prevent the sliding movement during normal vehicle handling. The capsule maintains the member and the steering column relative to one another, overcoming forces urging movement between the member and the steering column relative to one another, up to a first predetermined level of force. When the forces reach the first predetermined level, such as in an impact situation, the capsule breaks and releases the member and the steering column relative to one another. The apparatus of the present invention also includes an adjusting device associated with the capsule for adjusting the capsule to break in response to a second predetermined level of force lower than the first predetermined level of force.

18 Claims, 6 Drawing Sheets

ADAPTIVE RELEASE CAPSULE FOR STEERING COLUMN

FIELD OF THE INVENTION

The invention relates to a steering column of a vehicle and more particularly the invention relates to a capsule for connecting the steering column to a vehicle during normal vehicle handling and being breakable in response to an impact situation.

BACKGROUND OF THE INVENTION

In some vehicles, it is desirable to allow a steering column of the vehicle to separate from the vehicle during an impact situation. For example, during a crash, a driver of the vehicle can be propelled against the steering wheel by momentum. In other words, the vehicle decelerates quicker than the driver does and the driver is thrown forward into the steering wheel. To reduce the likelihood of injury to the driver, the steering column can break-away from the vehicle to absorb the kinetic energy of the driver. Capsules can connect the steering column to the vehicle during normal vehicle handling and will permit separation of the steering column from the vehicle during an impact situation.

SUMMARY OF THE INVENTION AND ADVANTAGES

The present invention provides an apparatus for supporting a steering wheel in a vehicle during normal vehicle handling and is breakable in response to an impact situation. The apparatus includes a member attachable to a vehicle and a steering column connected to the member for sliding movement. The apparatus also includes a capsule for connecting the member and the steering column to one another to prevent the sliding movement during normal vehicle handling. The capsule maintains the member and the steering column relative to one another, overcoming forces urging movement between the member and the steering column relative to one another, up to a first predetermined level of force. When the forces reach the first predetermined level, such as in an impact situation, the capsule breaks and releases the member and the steering column relative to one another. The apparatus of the present invention also includes an adjusting device associated with the capsule for adjusting the capsule to break in response to a second predetermined level of force lower than the first predetermined level of force.

The present invention advantageously provides an apparatus for adjusting the level of force that will break the capsule to enhance the release of the steering column from the vehicle. For example, the capsule can be adjusted to break at a relatively lower level of force in response to the size of the driver, the proximity of the driver to the steering wheel, the speed of the vehicle, or any combination of these factors.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
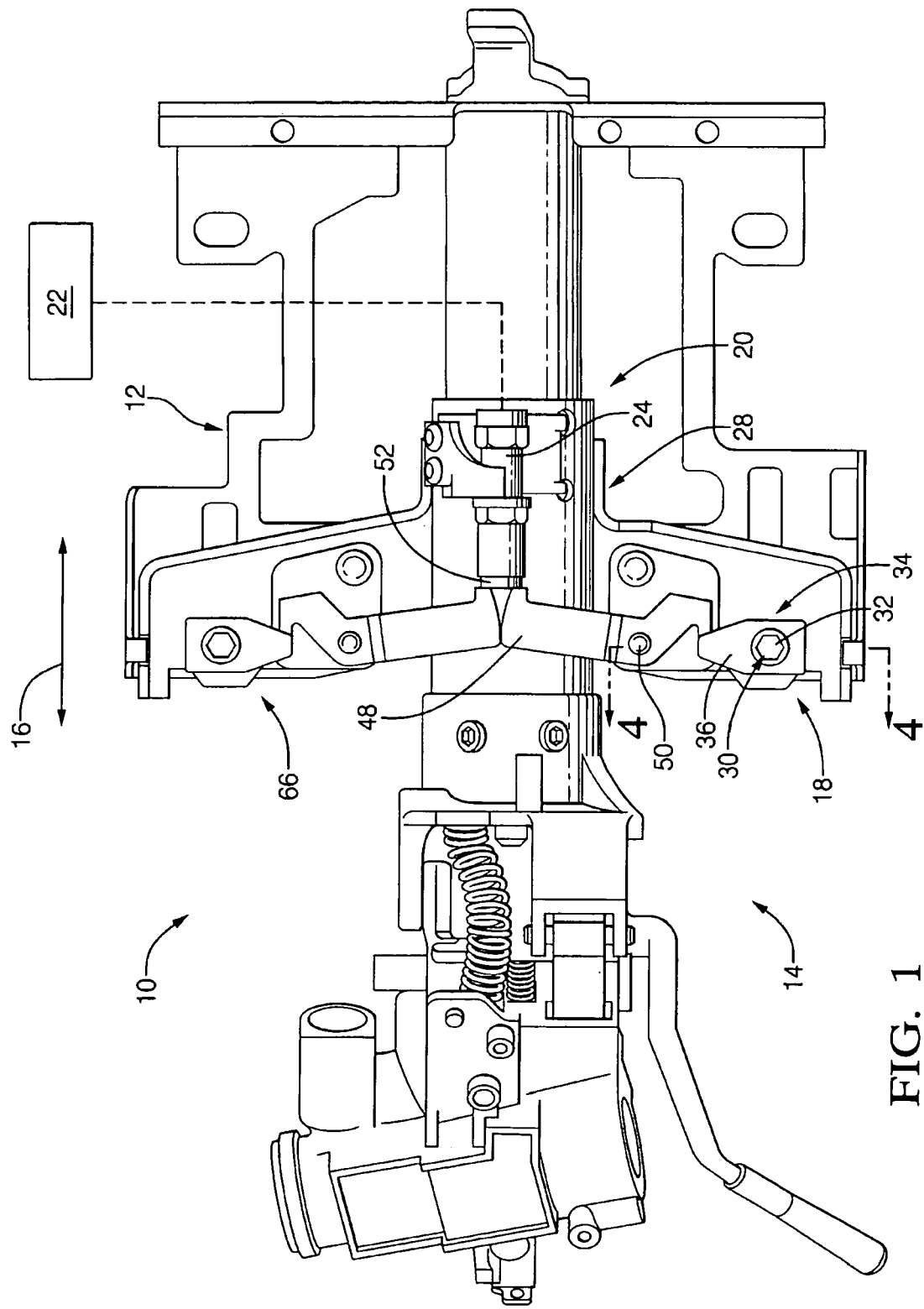
FIG. 1 is a bottom view of a first exemplary embodiment of the invention before a capsule has been adjusted by an adjusting device.
Figure 2:
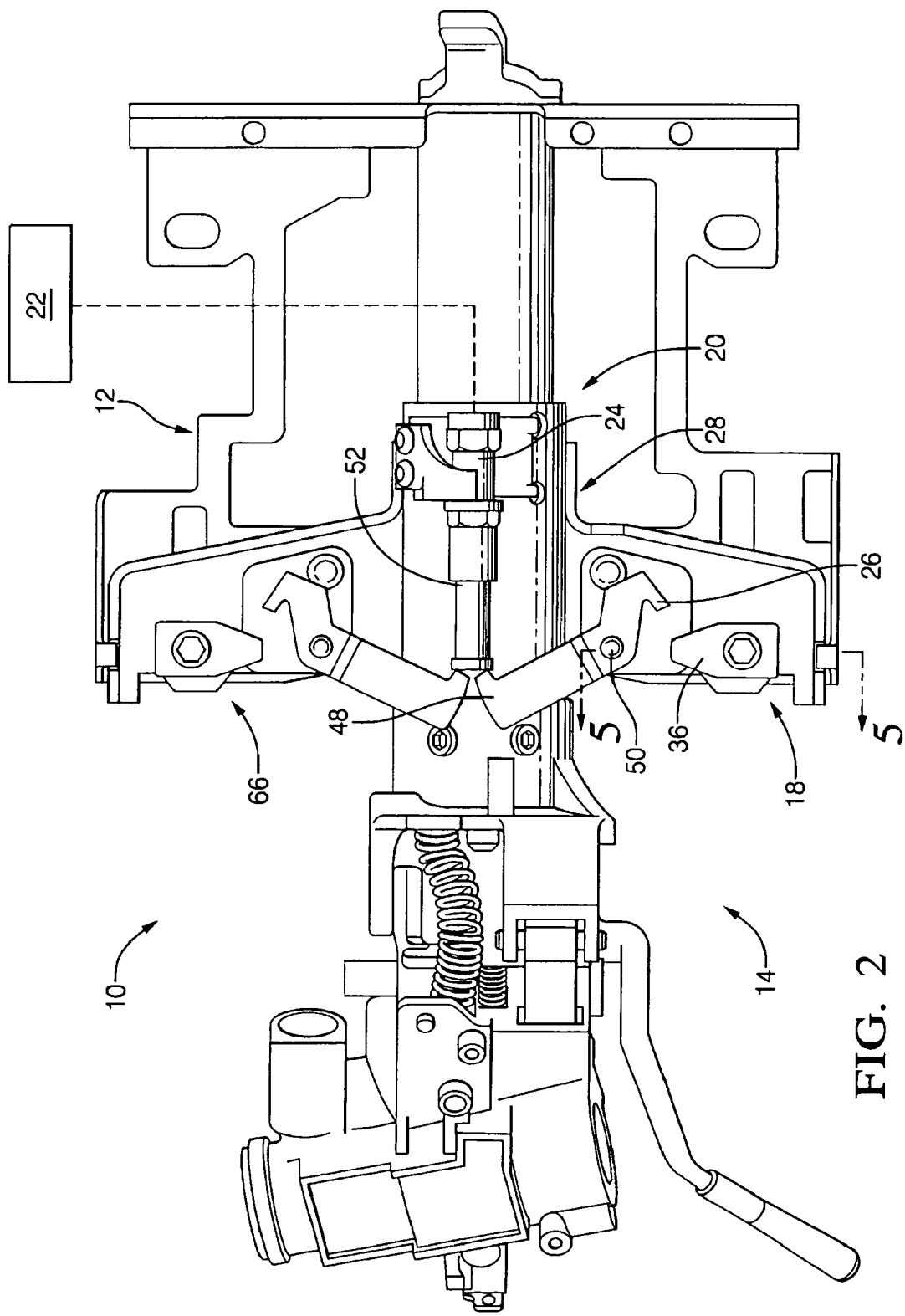
FIG. 2 is a bottom view of the first exemplary embodiment after the adjustment device has adjusted the capsule.
Figure 3:
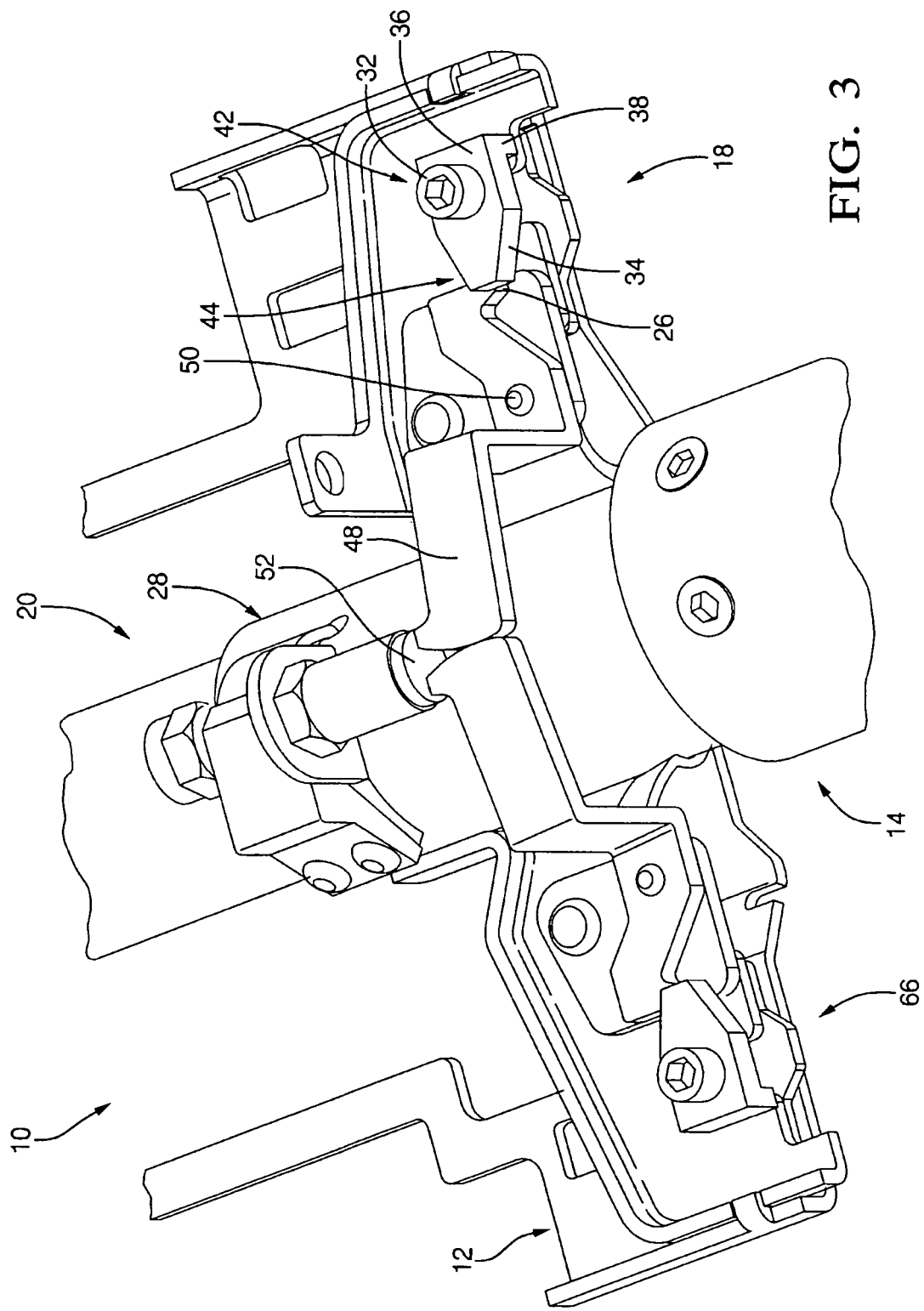
FIG. 3 is a perspective view of the bottom of the first exemplary embodiment before the adjusting device has adjusted the capsule.

Referring now to FIGS. 1–5, the present invention provides an apparatus 10 for supporting a steering wheel in a vehicle. The apparatus 10 includes a member 12 for attachment to the vehicle. The member 12 is a bracket in the exemplary embodiment of the invention; however, the member 12 can be any structure fixedly associated with the vehicle. The apparatus 10 also includes a steering column 14 connected to the member 12 for sliding movement 16. During normal vehicle handling, the member 12 and the steering column 14 are fixedly associated with respect to one another. However, in an impact situation, the steering column 14 can move relative to the member 12 in response to a predetermined level of force. For example, the force acting on the steering column 14 could be the result of a driver of the vehicle being thrust against the steering wheel in an impact situation.

The apparatus 10 includes the capsule 18 for connecting the member 12 and the steering column 14 with respect to one another. During normal vehicle handling, the capsule 18 resists forces tending to move the steering column 14 relative to the member 12. The capsule 18 can resist forces up to a first predetermined level and is broken in response to the first predetermined level of force. The predetermined level of force corresponds to the impact associated with the driver of the vehicle being thrust against the steering wheel in an impact situation such as a vehicle crash. When the capsule 18 is broken, the steering column 14 moves relative to the member 12 in sliding movement 16. The first exemplary embodiment includes a pair of capsules 18, 66 disposed on opposite sides of the steering column 14 and mirror images of one another.

Figure 4:
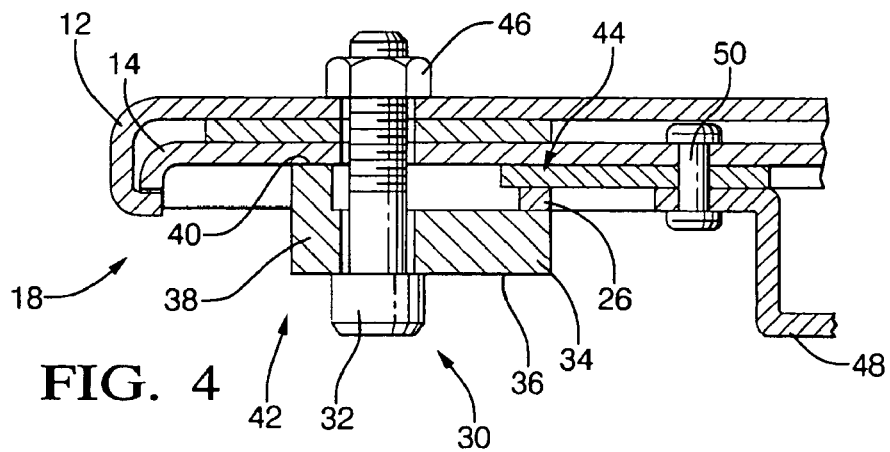
FIG. 4 is a cross-sectional view taken along section lines 4—4 in FIG. 1.
Figure 5:
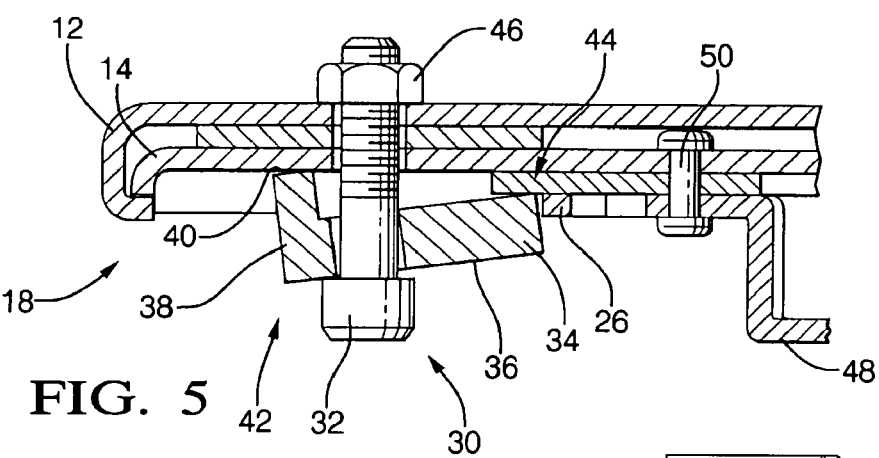
FIG. 5 is a cross-sectional view taken along section lines 5—5 in FIG. 2.

In the first exemplary embodiment of the invention, the capsule 18 is a squeeze capsule, preventing movement between the steering column 14 and the member 12 by squeezing the steering column 14 and the member 12 together to generate sufficient static friction to resist relative movement during normal vehicle handling. As best seen in FIG. 4, the member 12 and the steering column 14 are stacked on top of one another and the capsule 18 is disposed adjacent the steering column 14. A bolt 30 extends through the member 12, the steering column 14, and the capsule 18. The bolt 30 is engaged with a nut 46 and the member 12, the steering column 14, and the capsule 18 are squeezed together between a bolt head 32 of the bolt 30 and the nut 46 when the bolt 30 is tightened.

The apparatus 10 also includes an adjusting device 20 associated with the capsule 18 for adjusting the capsule 18 to break in response to a second predetermined level of force lower than the first predetermined level of force. It may be desirable to reduce the level of force required to break the capsule 18 based on the operating conditions of the vehicle. Generally, the vehicle would also include an energy absorbing member connected to the steering column that is engaged after the capsule 18 breaks and it may be desirable to engage the energy absorbing member as quickly as possible. In such a situation, it would be desirable to reduce the force required to break the capsule 18 sooner. The factors considered when changing the force required to break the capsule 18 include, but are not limited to, the speed of the vehicle, the size of the driver, and the proximity of the driver to the steering wheel. The invention provides a controller 22 in communication with appropriate sensors (not shown) for controlling the adjusting device 20 to adjust the capsule 18. The controller 22 is programmable and operable to determine when adjustment of the capsule 18 is desirable.

As set forth above, in the first exemplary embodiment of the invention, the capsule 18 is a squeeze capsule. The capsule 18 includes a first portion 34 defining a first engaging surface 36. As best seen in FIG. 4, the surface 36 engages the bolt head 32. The capsule 18 also includes a second portion 38 defining a second engaging surface 40. The second engaging surface 40 engages the steering column 14. In alternative embodiments of the invention, the capsule 18 could be disposed between the member 12 and the steering column 14.

The adjusting device 20 includes a portion 26 that is disposed between the capsule 18 and the steering column 14. The adjusting device 20 also includes a moving device 28 associated with the portion 26 to move the portion 26 relative to the capsule 18. For example, the portion 26 is defined at a first end of a rotatable arm 48 and the moving device 28 engages a second end of the rotatable arm 48 to rotate the arm 48 about a pin 50. The moving device 28 includes a pyrotechnic 24 and a shaft 52. As best seen in FIGS. 1 and 4, before the adjusting device 20 is engaged, the portion 26 is disposed between the capsule 18 and the steering column 14, and the shaft 52 is retracted. In response to a command from the controller 22 based on sensed operating conditions and programmable operating logic, the adjusting device 20 is engaged and the pyrotechnic 24 is fired to extend the shaft 52, best shown in FIG. 2. During extension, the shaft 52 urges the arm 48 to rotate about the pin 50, moving the portion 26 from between the capsule 18 and the steering column 14, best shown in FIG. 5.

The portion 26 of the adjusting device 20 defines the thickness corresponding to a first distance between the first portion 34 of the capsule 18 and the steering column 14. The second portion 38 of the capsule 18 extends transverse to the first portion 34 and, with the portion 26 of the adjusting device 20, supports the first portion 34 in spaced relation to the steering column 14. The second portion 38 is disposed at a first end 42 of the capsule 18 and the portion 26 of the adjusting device 20 as disposed at a second end 44 of the capsule 18. The second portion 38 of the capsule 18 and the portion 26 of the adjusting device 20 support the first portion 34 like legs support a table. When the portion 26 is removed, the first portion 34 collapses, decreasing the first distance to a lesser, second distance. At the second end 44, the capsule 18 can contact the steering column 14. As a result, the contact area between the bolt head 32 an the surface 36 is decreased and also the contact area between the second engaging surface 40 and the steering column 14 is decreased. Furthermore, the static friction between the capsule 18 and the steering column 14 is decreased and the force required to move the steering column 14 relative to the member 12 is decreased.

Figure 6:
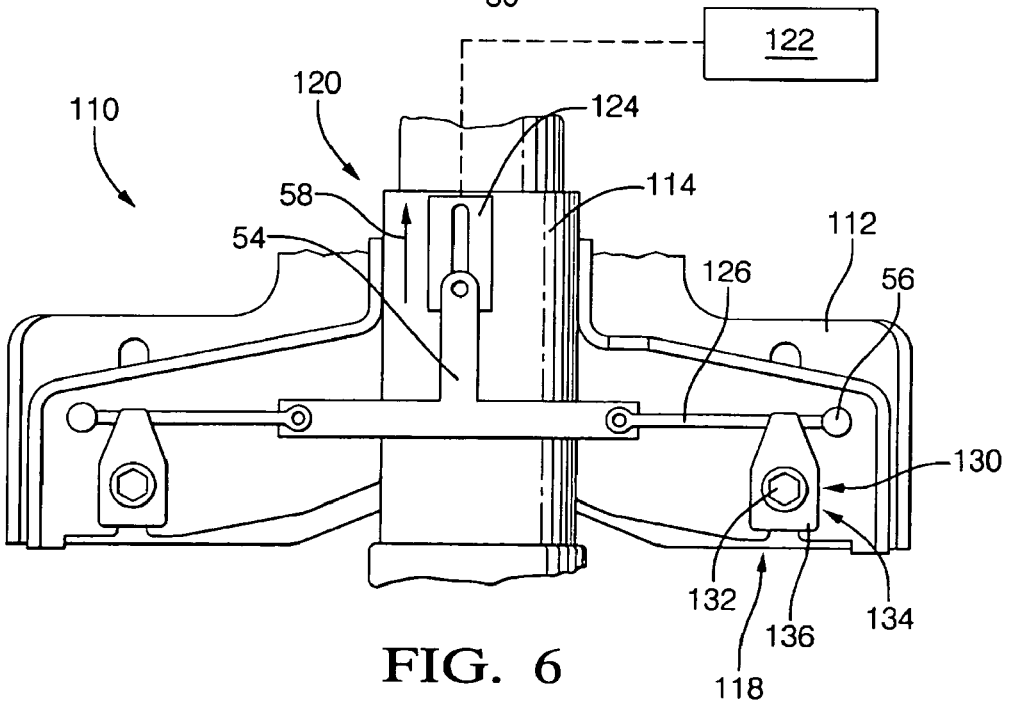
FIG. 6 is a bottom view of a second exemplary embodiment of the invention before the adjusting device has adjusted the capsule.
Figure 7:
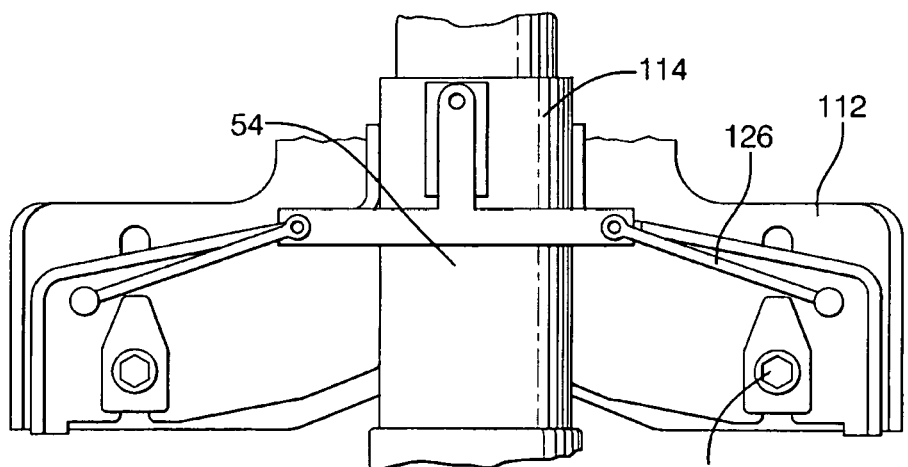
FIG. 7 is a bottom view of the second exemplary embodiment of the invention after the adjusting device has adjusted the capsule.

Referring now to FIGS. 6 and 7, in a second exemplary embodiment of the invention, an apparatus 110 includes a member 112, a steering column 114, a capsule 118, and an adjusting device 120. The capsule 118 is a squeeze capsule squeezed between a bolt head 132 of a bolt 130 and the steering column 114. The capsule 118 includes a first portion 134 and a first engaging surface 136 that engages the bolt head 132. The adjusting device 120 includes a portion 126 in the form of a cylindrical wire and a pyrotechnic 124 for moving the portion 126 from between the capsule 118 and the steering column 114. The adjusting device 120 also includes a linking member 54 pivotally connected to the portion 126. The portion 126 is also engaged with the steering column 114 at a pivoting connection 56. When the adjusting device 120 is engaged by a controller 122, the pyrotechnic 124 fires and urges the linking member 54 in a direction 58 to move the portion 126 from between the capsule 118 and the steering column 114, best shown in FIG. 7.

Figure 8:
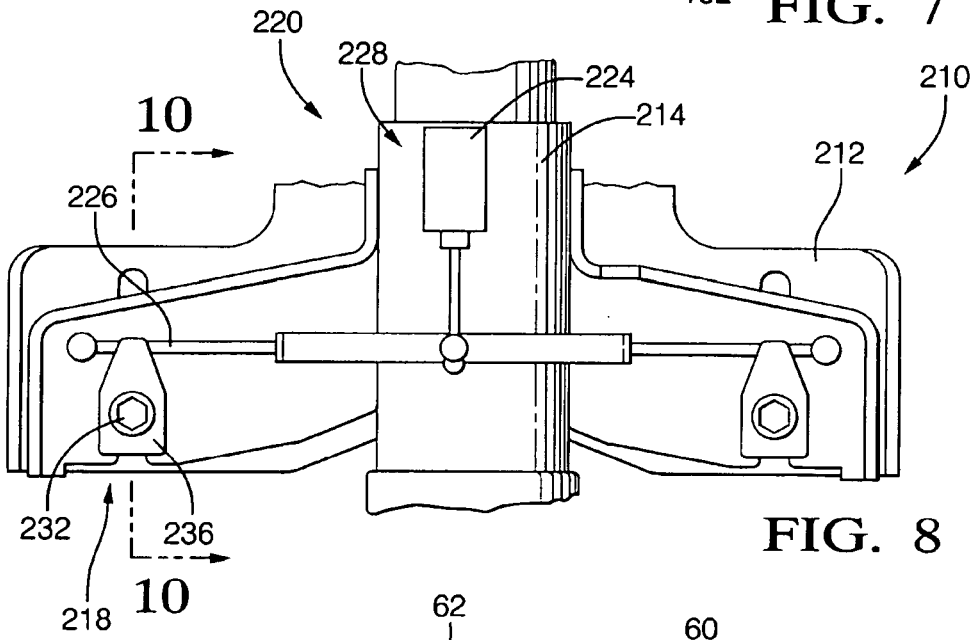
FIG. 8 is a bottom view of a third exemplary embodiment of the invention before the adjusting device has adjusted the capsule.
Figure 9:
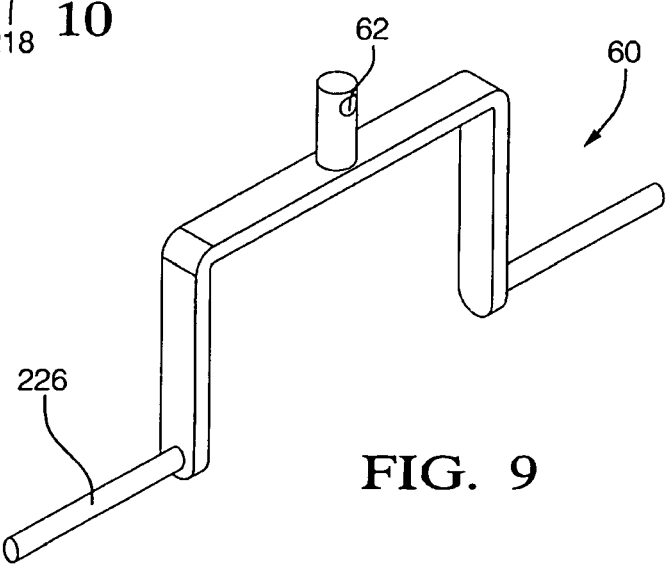
FIG. 9 is a perspective view of an elliptical bar of the third exemplary embodiment of the adjusting device.
Figure 10:
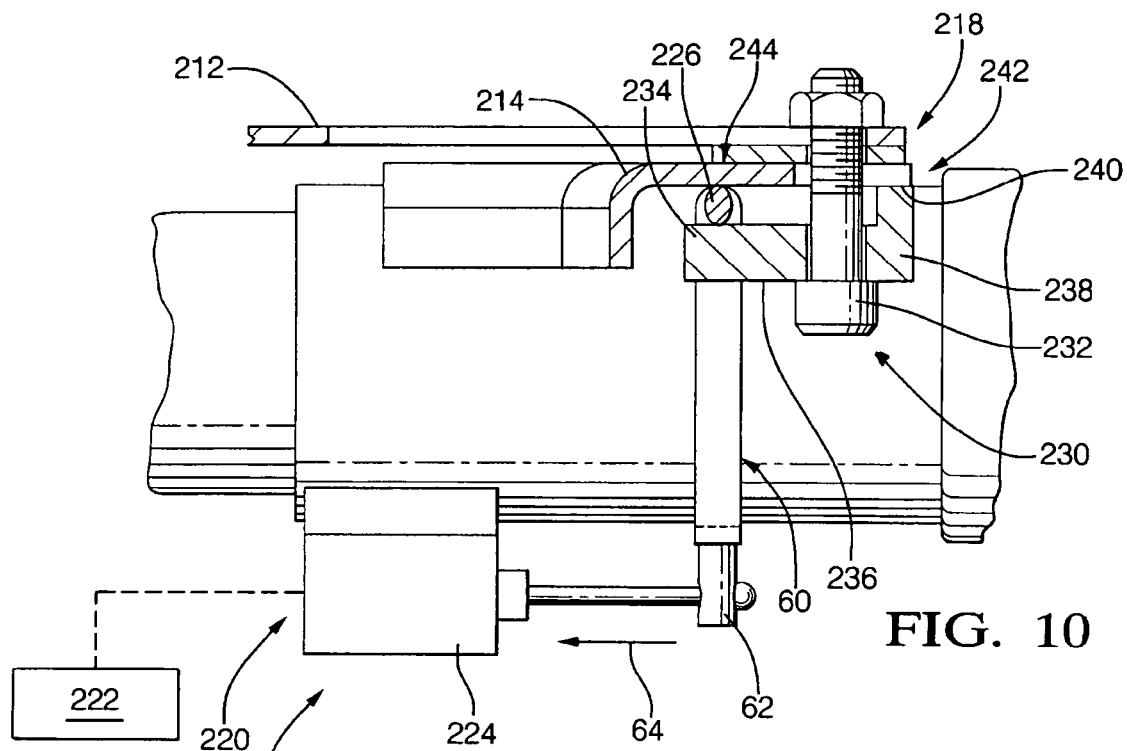
FIG. 10 is a partial cross-sectional view of the third exemplary embodiment of the invention before the adjusting device has adjusted the capsule.

Referring now to FIGS. 8–10, in a third exemplary embodiment of the invention, an apparatus 210 includes a member 212, a steering column 214, a capsule 218, and an adjusting device 220. The adjusting device 220 is controlled by a controller 222 to adjust the capsule 218. The capsule 218 is disposed between a bolt head 232 of a bolt 230 and the steering column 214. The capsule 218 includes a first portion 234 defining a first engaging surface 236 and a second portion 238 defining a second engaging surface 240.

The second portion 240 of the capsule 218 is disposed at a first end 242 of the capsule 218 and a portion 226 of the adjusting device 220 is disposed at a second end 244 of the capsule 218. The portion 226 of the adjusting device 220 defines an elliptical cross-section having a long diameter and a short diameter. Before the adjusting device moves the portion 226, the long diameter of the elliptical wire portion 226 defines the first distance between the first portion 234 of the capsule 218 and the steering column 214. Preferably, the longer diameter of the portion 226 is sized such that the engaging surfaces 236, 240 are flush with the bolt head 232 and the steering column 214, respectively, maximizing the contact areas between the surface 236 and the bolt head 232 and between the surface 240 and the steering column 214.

The adjusting device 220 includes a moving device 228 for moving the portion 226. The moving device 228 includes a pyrotechnic 224 and an linking member 60. When the adjusting device 220 is engaged by the controller 222, the pyrotechnic 224 fires and an end 62 of the linking member 60 moves in the direction 64. As a result, the portion 226 is rotated and the distance between the first portion 234 of the capsule 218 and the steering column 214 decreases from the longer diameter of the portion 226.

Figure 11:
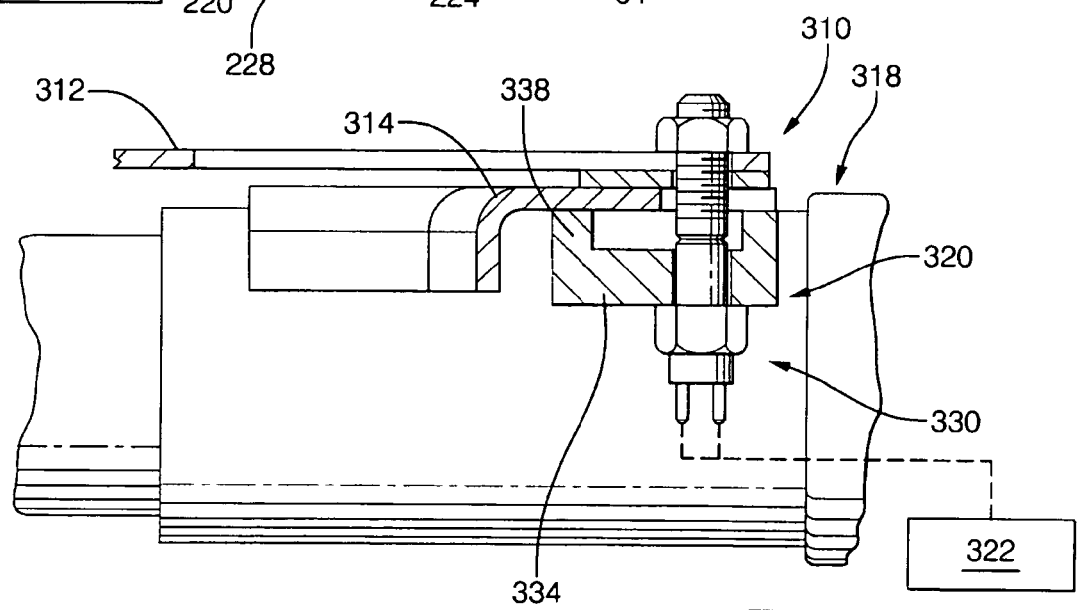
FIG. 11 is a cross-sectional view of a fourth exemplary embodiment of the invention before the adjusting device has adjusted the capsule.
Figure 12:
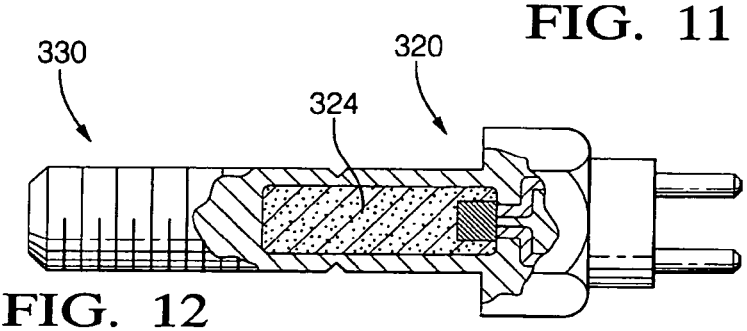
FIG. 12 is a cross-sectional view of a bolt and the adjusting device of the fourth exemplary embodiment of the invention.

Referring now to FIGS. 11 and 12, in a fourth embodiment of the invention, an apparatus 310 includes a member 312, a steering column 314, a capsule 318, and an adjusting device 320. The capsule includes a first portion 334 and a second portion 338 extending transverse to the first portion 334. The adjusting device 320 includes a pyrotechnic 324 disposed in the bolt 330. The apparatus 310 also includes a controller 322 for firing the pyrotechnic 324 and shearing the bolt 330 to allow the steering column 314 to move relative to the member 312.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for supporting a steering wheel in a vehicle comprising:
   a member for attachment to a vehicle;
   a steering column connected to said member for sliding movement;
   a capsule connecting said member and said steering column to one another to prevent said sliding movement between said member and said steering column up to a first predetermined level of force and to allow said siding movement between said member and said steering column in response to the first predetermined level of force acting on said steering column;
   an adjusting device associated with said capsule for adjusting said capsule to allow sliding movement between said member and said steering column in response to a second predetermined level of force lower than the first predetermined level of force and said adjusting device includes a portion disposed between said capsule and said steering column and a moving device associated with said portion to move said portion relative to said capsule; and
   said portion defines a first distance between said capsule and said steering column prior to movement and said moving device is operable to move said portion and decrease said first distance to a second distance.

2. The apparatus of claim 1 including a controller for controlling said adjusting device in adjusting said capsule.

3. The apparatus of claim 1 wherein said adjusting device includes a pyrotechnic for rapidly adjusting said capsule.

4. The apparatus of claim 1 wherein said capsule is selected from the group comprising a shear capsule and a squeeze capsule.

5. The apparatus of claim 1 wherein said moving device is operable to move said portion from between said capsule and said at least one of said steering column or said member to adjust said capsule.

6. The apparatus of claim 1 wherein said moving device is operable to rotate said portion between said capsule and said at least one of said steering column or said member to adjust said capsule.

7. The apparatus of claim 1 wherein said portion is selected from the group comprising a plate, a cylindrical wire, and an elliptical wire.

8. An apparatus for supporting a steering wheel in a vehicle comprising:
   a member for attachment to a vehicle;
   a steering column connected to said member for sliding movement;
   a capsule connecting said member and said steering column to one another to prevent relative sliding movement between said member and said steering column up to a first predetermined level of force and to allow said sliding movement between said member and said steering column in response to the first predetermined level of force acting on said steering column;
   a bolt having a bolt head and being engaged with said member wherein said steering column and said capsule are compressed between said bolt head and said member when said bolt is tightened; and
   an adjusting device associated with said capsule for adjusting said capsule to allow sliding movement between said member and said steering column in response to a second predetermined level of force lower than the first predetermined level of force.

9. The apparatus of claim 8 wherein said capsule is disposed between any two of said bolt head and said member and said steering column.

10. The apparatus of claim 9 wherein said capsule is disposed between said bolt head and said steering column and wherein said capsule includes a first portion defining a first engaging surface contacting said bolt head and a second portion defining a second engaging surface contacting said steering column wherein said second portion extends transverse to said first portion and said first and second engaging surfaces are parallel to one another.

11. The apparatus of claim 10 wherein said first portion of said capsule includes first and second ends and a portion of said adjusting device and said second portion of said capsule are disposed at opposite ends of said first portion of said capsule.

12. The apparatus of claim 11 wherein said portion of said adjusting device and said second portion of said capsule support said first portion of said capsule in spaced relation with respect to said steering column.

13. The apparatus of claim 12 wherein said adjusting device includes a moving device associated with said portion to move said portion relative to said capsule.

14. The apparatus of claim 13 wherein said portion of said adjusting device defines a first distance between said capsule and said steering column prior to movement and said moving device is operable to move said portion and decrease said first distance to a second distance.

15. The apparatus of claim 14 wherein said moving device is operable to move said portion of said adjusting device from between said capsule and said steering column to adjust said capsule.

16. The apparatus of claim 14 wherein said moving device is operable to rotate said portion of said adjusting device between said capsule and said steering column to adjust said capsule.

17. The apparatus of claim 10 wherein said adjusting device is operable to change a contact area between said bolt head and said first engaging surface.

18. The apparatus of claim 8 wherein said adjusting device includes a pyrotechnic disposed in said bolt.

* * * * *